(12) United States Patent
Clark (10) Patent No.: US 10,373,243 B2
(45) Date of Patent: Aug. 6, 2019

(54) METHOD OF DISPLAYING AND TRANSACTING ELECTRONIC TRADING CARDS

(76) Inventor: Roy Clark, Rockford, MI (US)

( * ) Notice: Subject to any disclaimer, the term of this patent is extended or adjusted under 35 U.S.C. 154(b) by 1178 days.

(21) Appl. No.: 13/579,417

(22) PCT Filed: Feb. 15, 2011

(86) PCT No.: PCT/US2011/024944
§ 371 (c)(1),
(2), (4) Date: Oct. 16, 2012

(87) PCT Pub. No.: WO2011/100766
PCT Pub. Date: Aug. 18, 2011

(65) Prior Publication Data
US 2013/0211966 A1    Aug. 15, 2013
US 2014/0108203 A9    Apr. 17, 2014

Related U.S. Application Data

(60) Provisional application No. 61/304,550, filed on Feb. 15, 2010.

(51) Int. Cl.
*G06Q 40/00* (2012.01)
*G06Q 30/06* (2012.01)
(Continued)

(52) U.S. Cl.
CPC .......... *G06Q 30/0643* (2013.01); *A47L 11/33* (2013.01); *A47L 11/4013* (2013.01);
(Continued)

(58) Field of Classification Search
CPC ............................... G06Q 40/04; G06Q 30/08
(Continued)

(56) References Cited

U.S. PATENT DOCUMENTS 5,748,731 A * 5/1998 Shepherd ............... G06Q 30/06
705/57
6,200,216 B1    3/2001 Peppel
(Continued)

FOREIGN PATENT DOCUMENTS

JP    2002-015196 A    1/2002
JP    2005-259101 A    9/2005
(Continued)

OTHER PUBLICATIONS

Sugiura, Nobuhiko, "Electronic Money and The Law: Legal Realities and Future Challenges", Aug. 1, 2008, Pacific Rim Law & Policy Journal Association (Year: 2008).*
(Continued)

*Primary Examiner* — Eric T Wong
*Assistant Examiner* — Kevin T Poe
(74) *Attorney, Agent, or Firm* — McGarry Bair PC (57) ABSTRACT

A method of displaying, buying, and trading electronic trading cards on a computer or handheld electronic device by running an electronic trading card application on the computer or handheld device that communicates via the internet with at least one remote server containing a registry of all electronic trading cards. The electronic trading card application running on the computer or handheld device transmits a transaction request to the at least one remote server to execute a purchase or trade between two users of one or more electronic trading cards. The electronic trading card application further displays various components of an electronic trading card based upon user inputs.

7 Claims, 5 Drawing Sheets

(51) Int. Cl.
*A63F 13/85* (2014.01)
*G06Q 30/08* (2012.01)
*G06Q 10/06* (2012.01)
*G06Q 40/04* (2012.01)
*G06Q 20/10* (2012.01)
*G06Q 40/02* (2012.01)
*G06Q 30/00* (2012.01)
*G07F 17/32* (2006.01)
*A47L 11/33* (2006.01)
*A47L 11/40* (2006.01)
*B65D 5/10* (2006.01)
*G06Q 50/00* (2012.01)

(52) U.S. Cl.
CPC ....... *A47L 11/4025* (2013.01); *A47L 11/4041* (2013.01); *A63F 13/85* (2014.09); *B65D 5/10* (2013.01); *G06Q 10/06* (2013.01); *G06Q 20/10* (2013.01); *G06Q 30/00* (2013.01); *G06Q 30/06* (2013.01); *G06Q 30/08* (2013.01); *G06Q 40/02* (2013.01); *G06Q 40/04* (2013.01); *G07F 17/32* (2013.01); *A63F 2300/308* (2013.01); *A63F 2300/407* (2013.01); *A63F 2300/575* (2013.01); *A63F 2300/8052* (2013.01); *G06Q 40/00* (2013.01); *G06Q 50/00* (2013.01)

(58) Field of Classification Search
USPC .......................................................... 705/35
See application file for complete search history.

(56) References Cited

U.S. PATENT DOCUMENTS

| | | | | |
|---|---|---|---|---|
| 2001/0056383 A1* | 12/2001 | Shuster | ................. | G06Q 20/10 705/26.62 |
| 2002/0161666 A1 | 10/2002 | Fraki et al. | | |
| 2004/0215538 A1* | 10/2004 | Smith | ................. | G06Q 40/00 705/35 |
| 2005/0246193 A1* | 11/2005 | Roever | ................. | G06Q 40/00 705/35 |
| 2007/0086614 A1* | 4/2007 | Ikeda | ................. | H04R 1/2803 381/334 |
| 2007/0157251 A1* | 7/2007 | Shrivastava | ...... | G06F 17/30058 725/60 |
| 2007/0232399 A1* | 10/2007 | Kathman | ................. | A63F 13/12 463/42 |
| 2007/0233558 A1* | 10/2007 | Jones | ................. | G06Q 30/02 705/14.27 |
| 2007/0271184 A1* | 11/2007 | Niebert | ................. | H04L 63/102 705/51 |
| 2008/0243676 A1* | 10/2008 | Smith | ................. | G06Q 40/025 705/37 |
| 2009/0204534 A1* | 8/2009 | Tilly | ................. | G06Q 40/04 705/37 |
| 2009/0299891 A1 | 12/2009 | Sapir et al. | | |
| 2010/0082491 A1* | 4/2010 | Rosenblatt | ............ | G06Q 10/02 705/65 |
| 2010/0177044 A1* | 7/2010 | Plestid | ................. | G06F 1/169 345/167 |
| 2010/0217658 A1* | 8/2010 | Yankelevich | .......... | G06Q 30/02 705/14.13 |

FOREIGN PATENT DOCUMENTS

| | | |
|---|---|---|
| KR | 10-2006-0101240 A | 9/2006 |
| KR | 10-0645173 B1 | 11/2006 |
| KR | 10-0918024 B1 | 9/2009 |
| WO | 2001/047166 A1 | 6/2001 |
| WO | 2005/048159 A1 | 5/2005 |

OTHER PUBLICATIONS

Diehl, Eric, Lelievre, Sylvain, "SmartRight: How smart cards fight video piracy", 2002, Thomson multimedia Corporate Research (Year: 2002).*

Lin, Chia-Chen, "Digital Right Schemes for Limited Issue and Flexible Division", Feb. 2008, International Journal of Computer Science and Network Security, Volumn 8 No. 2, (Year: 2008).*

Fussell, James A, Toying with consumers Turning everyday playthings into hotly sought-after collectibles has been a boon for the industry but a bane for parents: [CITY Edition], Aug. 1999, Florida Times Union [Jacksonville, FL] (Year: 1999).*

Jiang, Hua, "Study on Mobile E-commerce Security Payment System", 2008, International Symposium on Electronic Commerce and Security, (Year: 2008).*

"Leetch, Gillian, Mangina, Eleni," A Multi-Agent System to Stream Multimedia to Handheld Devices, 2005, International Conference on Computational Intelligence and Multimedia Applications (Year: 2005).*

* cited by examiner

METHOD OF DISPLAYING AND TRANSACTING ELECTRONIC TRADING CARDS

CROSS-REFERENCE TO RELATED APPLICATIONS

This application is a National Phase application of International Application No. PCT/US2011/024944, filed Feb. 15, 2011, which claims the benefit of U.S. Provisional Application No. 61/304,550, filed Feb. 15, 2010, both of which are incorporated herein by reference in their entirety.

CROSS-REFERENCE TO RELATED APPLICATION

This is an international application claiming the benefit of U.S. Application Ser. No. 61/304,550, filed Feb. 15, 2010, which is fully incorporated by reference herein.

BACKGROUND OF THE INVENTION

This invention relates generally to the field of electronic trading cards.

The sports trading card industry records greater than $200 million in revenue and dates back to the late 1800's. Over the past 100 years the trading card products have not changed much. The cards are constructed of cardboard or heavy paper, typically with a picture of the sports star on the front side and statistical data of the player on the back side. In the early days of this product, the cards were often distributed in cigarette packs. More recently the cards are packaged in wax paper packs with a stick of chewing or bubble gum. In addition to wax paper packs, the cards are often sold in cellophane packs, complete sets for a particular year, or as individual cards or sets generated by individual retailers and sellers.

Electronic trading cards, much like cardboard/paper trading cards, can be purchased, stored, traded or sold. Additionally, just like cardboard/paper trading cards, electronic trading cards can be sold as packs, sets, or consumer or retailer defined sets such as by team, position, MVPs, or as rookie players. Electronic trading cards may be displayed on a personal computer or a personal handheld device. Like cardboard/paper based trading cards, electronic trading cards may contain an image of the player and statistics/performance of the player, but may go beyond that to include electronic cross referencing information, video clips, sound recordings, additional images, and enhanced statistics/performance such as from a player's minor league play or from college play.

BRIEF DESCRIPTION OF THE INVENTION

In one embodiment, a method of purchasing at least one electronic trading card from a computer or handheld device includes storing the electronic trading card on one or more servers, wherein each of the servers is in communication with at least one other server. The methods also includes receiving an order from a user for the purchase of the electronic trading card, wherein the user runs an electronic trading card application from his computer or handheld device and places the order on the electronic trading card application, electronically transmitting the electronic trading card to the user's computer or handheld device, and displaying the electronic trading card on the user's computer or handheld device, wherein the electronic trading card application accepts the electronic transmission of the electronic trading card and displays the contents of the electronic trading card.

A method of trading at least one electronic trading card on a computer or handheld device comprising a first user running an electronic trading card application on the computer or handheld device and a second user running an electronic trading card application on another computer or handheld device. The first user accesses a trading screen on the electronic trading card application and enters a first grouping containing an electronic trading card identifier that represents the electronic trading card to be exchanged by means of sending to the second user and entering a second grouping containing an electronic trading card identifier representing the electronic trading card to be exchange by means of receiving from the second user. Both the first grouping and the second grouping identifiers are transmitted to a server in communications with another server. One server verifies the ownership of the electronic trading cards comprising the first and second grouping and one server sends a trading request confirmation to the second user running the electronic trading card application on another computer or handheld device and the second user confirms the trading request. The server receives the electronic trading cards of the first and second grouping from the first and second user and then retransmits the first grouping of electronic trading cards to the second user and the second grouping of electronic trading cards to the first user.

DETAILED DESCRIPTION OF THE INVENTION

The present invention is related to methods of transacting and displaying electronic trading cards. These methods include the process of purchasing electronic trading cards, exchanging electronic trading cards with another user, selling electronic trading cards and displaying different components of an electronic trading card.

Figure 1:
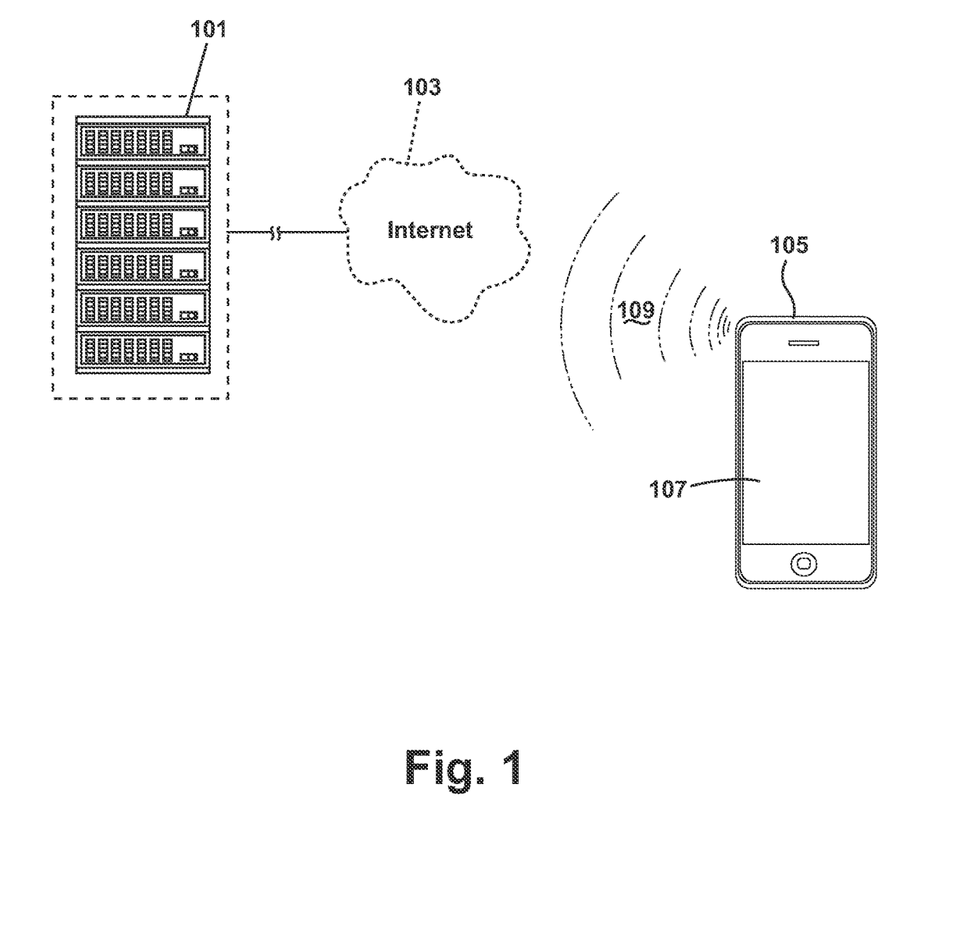
FIG. 1 is a schematic illustration a server and a hand held device communicatively linked to the internet.

In one embodiment there are at least one or more servers 101 connected to the internet 103 as illustrated in FIG. 1. The connection to the internet 103 could be by any variety of known means including by ethernet cable or wirelessly. If there are more than one server, each of the servers may be in communications with each of the other servers. The at least one or more servers may or may not be collocated with each other. The at least one server is typically comprised of microprocessors, printed circuit boards (PCBs), volatile or non-volatile memory, static or dynamic memory, and magnetic, optical or other known storage solutions. The at least one server 101 stores a registry of information about every electronic trading card in a universe of trading cards and updates that registry whenever an electronic trading card from that universe is bought, sold, or traded.

There also exists a handheld device 105 that is linked to the internet by way of a wireless connection 109 with a display screen 107. Any number of devices could be substituted for or be construed as the handheld device 105, including but not limited to a personal computer, a laptop computer, a netbook, a tablet or pad computing device, a digital media reader, a personal digital assistant, or a smart phone. Additionally, the handheld device 105 may have a variety of user input mechanisms including but not limited to a keyboard, mouse, pullout keyboard, electronic pop-up keyboard, touch sensitive display screen, motion sensors, such as micro-electromechanical system (MEMS) based multi-axis accelerometers, voice recognition, and handwriting recognition. Although the present invention may be implemented in various embodiments using any variety or combination of known user input mechanisms, the embodiment discussed will rely on a handheld device 105 that receives user input in the form of touch sensitive display screen 107, electronic pop-up keyboard, and accelerometer-based motion sensors. The handheld device 105 has an electronic trading card application software (not shown) installed on it that can be executed on the handheld device which allows the handheld device to communicate with the at least one server via a wireless connection 109 to the internet 103 to carry out a variety of electronic trading card transactions including buying, selling, trading, and displaying various components of electronic trading cards.

Figure 2:
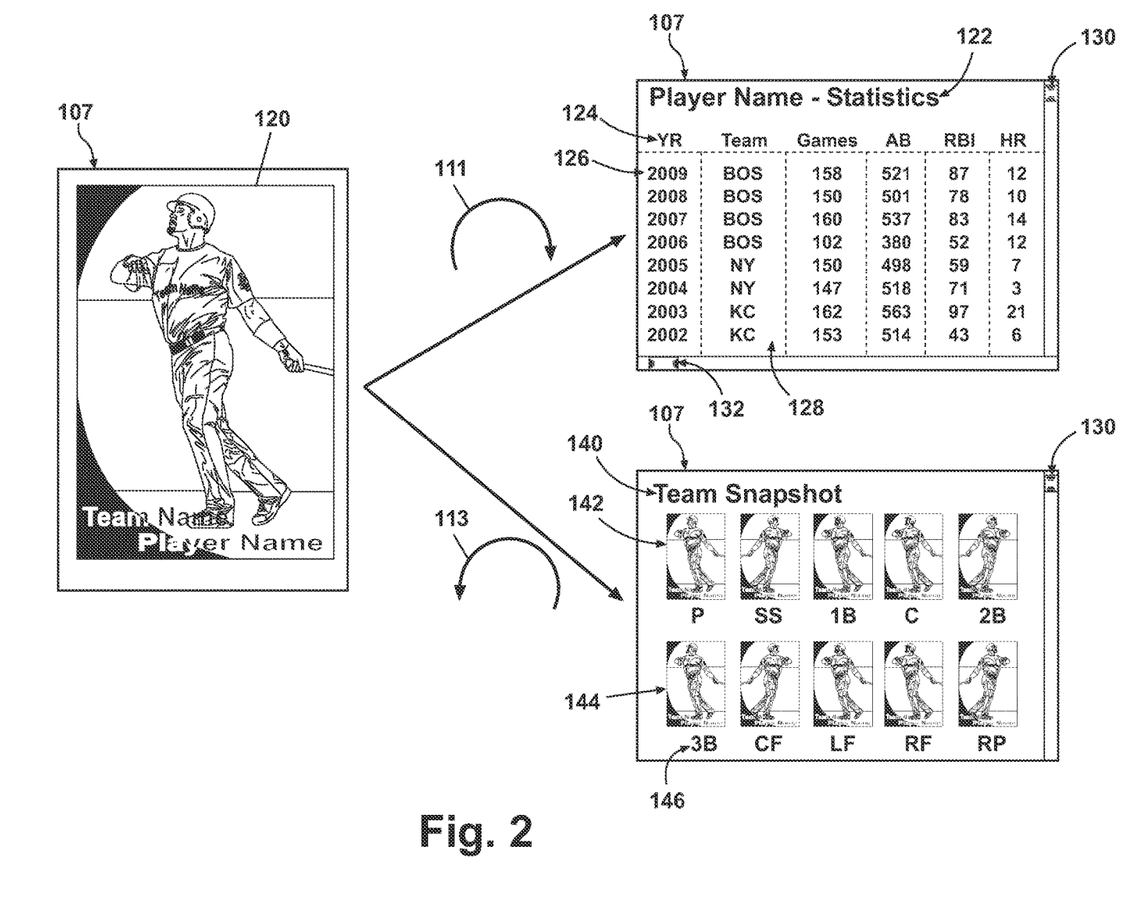
FIG. 2 is a schematic view of the display of a hand held device displaying an electronic trading card.

The display of various components of an electronic trading card 120 on the touch sensitive display screen 107 is shown in FIG. 2. The electronic trading card may be comprised of various components including, but not limited to the player's primary image, the player's statistics/performance, additional player pictures, player's team or other grouping snapshot pictures, video clips, enhanced statistics/performance such a players statistics/performance in the minor leagues or in college sports or real time updated performance from the current sports season, and a unique identifier. The player's primary image may be similar to paper/cardboard trading cards with a picture of the players face or a player in action. The image may comprise a picture with a smaller picture overlapping the larger picture. For example the image might be of a larger picture showing a football player throwing a football with a smaller picture overlapping a portion of the larger picture showing the face of the player without his protective gear. The player's statistics/performance data may be presented in a tabular format showing the year and the associated statistics collected for the player in that year. While a paper/cardboard based trading card is limited in surface area to display additional pictures, with an electronic trading card, there could be any number of additional pictures of the player as components of the full electronic trading card, and these pictures can be displayed one at a time and manipulated, such as by zooming in or zooming out. A player's team or other grouping can also be displayed as linked electronic trading cards. As a further advantage over paper/cardboard trading cards, the electronic trading card may include one or more video clips of the player. For example, the video clip could be highlight clip such as a football quarterback throwing a touchdown pass or a baseball slugger hitting a homerun. The electronic trading card, without any limits on printed surface area, allows the opportunity to display enhanced statistics such as a player's pre-professional performance/statistics. The enhanced statistics may also include real time updating of the player's performance from the present playing season. The electronic trading card will also include a unique identifier, such as a serial number, to uniquely identify the electronic trading card for the purposes of buying, selling, and trading electronic trading cards. The serial number may or may not be indicative of the date of the electronic trading card's production.

In one embodiment, the player's primary image may be the default electronic trading card component when the handheld device is held in a portrait orientation, where the longer sides of the display run in the vertical direction and define the width of the image and the shorter sides of the display run in a horizontal direction and define the height of the image.

In one embodiment, if the user rotates the handheld device 105 in the clockwise direction 90 degrees as depicted in 111, such that the touch sensitive display screen 107 is in a landscape orientation, where the longer sides of the display run in the horizontal direction and define the height of the screen and the shorter sides of the display run in a vertical direction and define the width of the screen, then the player statistics/performance data is displayed on the screen. The display of the statistical/performance data may be in tabular form and include a title 122, multiple columns such as 124, listing of years 126 and data 128 populated throughout the table. If the statistical/performance data is too voluminous to fit into the display, then the electronic trading card application will generate a vertical scroll bar 130 and a horizontal scroll bar 132 so that the user may scroll in the vertical and horizontal directions, respectively, to view the entirety of the data by touching points on the scroll bars 130 and 132 or by dragging the scroll along the scroll bars 130 and 132. The handheld device detects the motion, orientation, and direction of rotation using accelerometer based motion detector devices inside the handheld device.

Continuing with the same embodiment, if the user rotates the handheld device 105 in the counterclockwise direction 113 to achieve a portrait orientation of the touch sensitive display screen 107, then a team snapshot may be displayed with a title 140, and a thumbnail picture of each of the individual players such as 142 and 144 and the position of each of the individual players such as 146. If all the thumbnail pictures of the players of the team cannot be displayed in the space available on the touch sensitive display screen 107, then the electronic trading card application will generate either or both of a vertical and horizontal scroll bar. As an example only a vertical scroll bar 130 has been generated for displaying the team snapshot in FIG. 2. As an additional feature, a user may select and display one of the other player's electronic trading card, if the user were to select the desired player's thumbnail picture by touching the picture and if the user owns the electronic trading that he selected. In another embodiment, by selecting one of the other player's thumbnail pictures, the user may bring up all of the electronic trading cards, if any, of that player that the user may own from any year or series of electronic trading card.

The same information discussed above could be accessed by means other than by using inputs from the accelerometer-based motion sensors within the handheld device. For example, in other embodiments, one may select one of various components such as the statistics/performance measures by touching predetermined portions of the touch sensitive display screen 107 or by audio input such as by speaking instructions such as 'LOAD STATISTICS', or 'SHOW VIDEO CLIP'.

Figure 3:
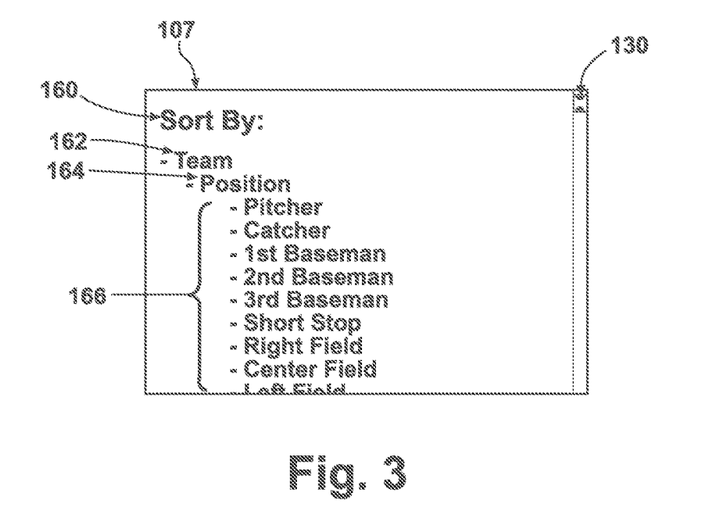
FIG. 3 is a schematic view of the classification of the electronic trading cards.

When a user owns a plurality of electronic trading cards, individual electronic trading cards can be selected by displaying a variety of subsets of the full collection of the electronic trading cards. Each electronic trading card may fit in a variety of subsets. An example of finding a particular electronic trading card is shown in FIG. 3. In this case the touch sensitive display screen 107 displays a means to sort through the plurality of electronic trading cards. This display and user input screen generated by the electronic trading card application includes a title 160 that instructs the user to select criteria by which to sort the electronic trading cards. A first level sorting criterion of 'Position' 164 is selected. This brings up a list of second level criteria 166 to choose from. By choosing a second level sorting criteria, a list of individual electronic trading cards are generated from which the user can select one to display. For example, if the user is to select 'Short Stop' from the complete list 166, it displays a list of all baseball player electronic trading cards that the user owns of players that play in the short stop position. An example of an unselected first level selection criterion 162 is shown. If that criterion were selected, then it would bring up a list of second level sorting criteria that includes all teams of the sports' players of the electronic trading cards that the user owns. If the number of selection criteria are so many that they can not all be displayed at the same time on the touch sensitive display screen 107, then the electronic trading card application will generate a vertical scroll bar 130 so that the user may scroll through to see all of the sorting selection criteria. It is obvious that each electronic trading card can be a member of various different subsets and thereby be selected by multiple sorting selection criteria. In the present example, the first baseman player from the Texas Rangers will belong to both the subset of '1$^{st}$ Baseman', as well as, the subset of 'Texas Rangers'. There can be a wide variety of subsets, including, but not limited to, sport, position, most valuable player (MVP), team, member of the hall of frame, age, rookies, and postseason play.

Figure 4:
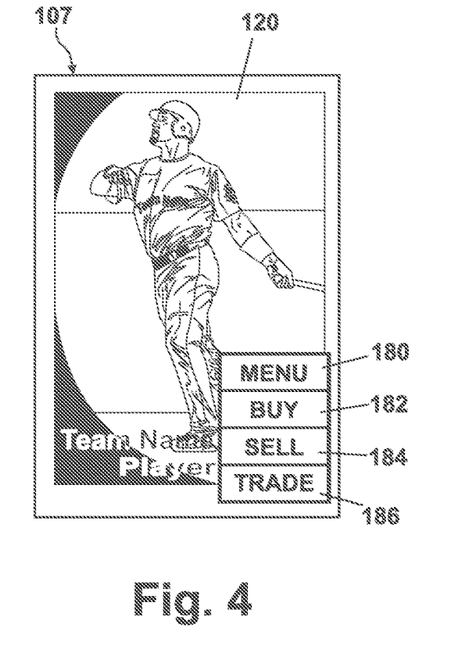
FIG. 4 is a schematic view of an electronic trading card with a menu of options.

FIG. 4 displays another method to select transactions on the touch sensitive display screen 107 displaying an electronic trading card 120. By tapping a portion of the touch sensitive display screen 107, such as at the bottom right corner, a menu 180 can be invoked. This menu allows the user to select various options to transactions, such as buying 182, selling 184, or trading 186 an electronic trading card. The user selects one of these options to move to another screen where the selected transaction can be carried out by way of further interaction by the user with the electronic trading card application.

Figure 5:
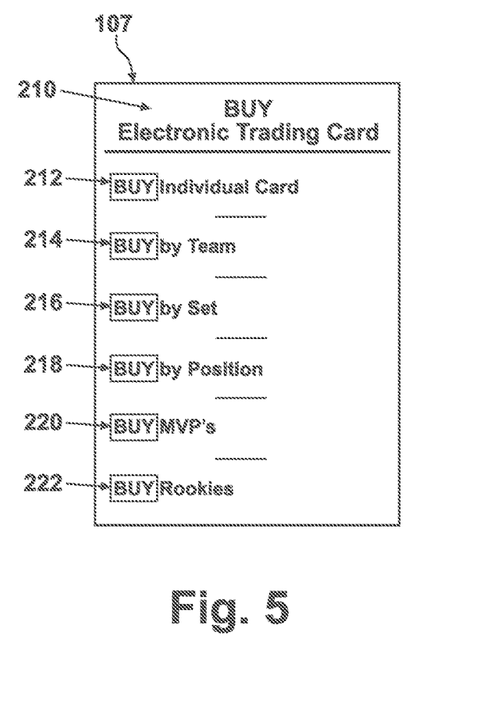
FIG. 5 is a schematic view of an electronic trading card buying menu.

If the user chooses to buy an electronic trading card 182 from the menu 180 of FIG. 3, then the next display on the touch sensitive display screen 107 may be that of FIG. 5. In this display, there is a title 210 indicative of a buy transaction and various buying options 212, 214, 216, 218, 220, and 220 to buy one or more electronic trading cards. For example one may choose to buy an individual electronic trading card 212, buy a complete team's electronic trading cards 214, buy a complete set of electronic trading cards 216, buy the electronic trading cards for a particular position 218, buy the electronic trading cards of all the most valuable players (MVPs) 220, or buy the electronic trading cards of all the new or rookie players 222. A user would select one of a buy option from the plurality of buy options 212, 214, 216, 218, 220, 222 presented on the touch sensitive display screen 107. By selecting one of the buy options the electronic trading card application running on the handheld device 105 will present a new set of options on the touch sensitive display screen 107 to select and purchase the user's desired electronic trading card or cards.

Figure 6A:
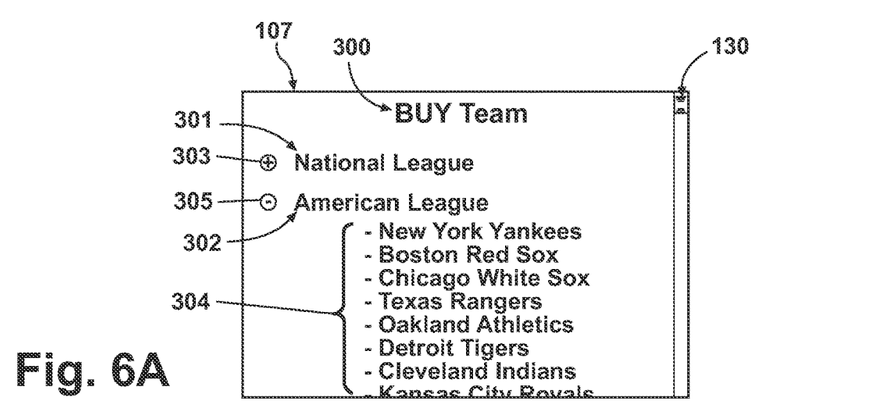
FIG. 6A is a representation of the process of purchasing an electronic trading card.

By way of example, the transaction associated with purchasing 'BUY by Team' upon the user selection of the associated option 214 is shown in greater detail in FIG. 6. The touch sensitive display screen 107 generated by the electronic trading card application displays a title 300 that indicates the transaction type that the user is performing as shown in FIG. 6A. A hierarchical menu with options for selecting the team that the user wants to buy will be present. In this embodiment, each of the teams is listed under the league that they are in. The user can choose a league such as 'National League' 301 or 'American League' 302 and select an expansion button 303 to display all of the teams within that chosen league or select a contraction button 305 to hide the teams of the league listed adjacent to the contraction button 305. In this example, the user has selected to expand the 'American League' option 302 to display all the teams in the 'American League' 304 and to hide all the teams in the 'National League' option 301. It should be noted that the expansion button 303 will appear adjacent to an option where the teams are hidden and the contraction button 305 will appear adjacent to an option where the teams are displayed. The electronic trading card application will also generate a vertical scroll bar 130, if the number of options is so great that they can not be displayed on the touch sensitive display screen simultaneously. The user may use the scroll bar 130 to move the user options list up and down on the touch sensitive display screen to see the entirety of the options available.

Figure 6B:
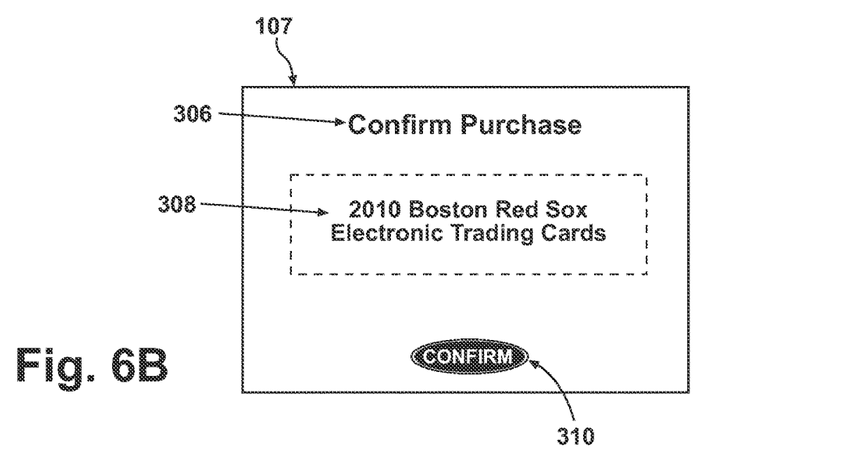
FIG. 6B is a representation of confirmation display for the purchase of an electronic trading card.
Figure 6C:
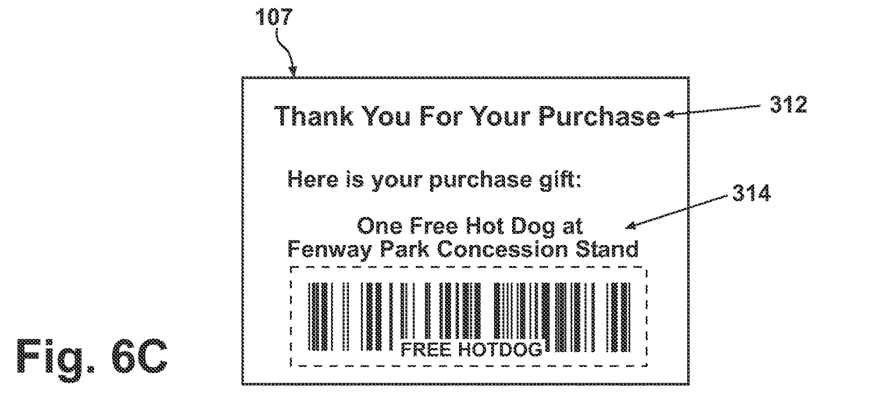
FIG. 6C is a representation of a purchase gift screen after purchase of an electronic trading card.

Upon the user selecting an option, such as 'Boston Red Sox' from the list of options 304, the electronic trading card application generates the display of FIG. 6B to be displayed on the touch sensitive display screen 107. This screen will have a title 306 that indicates to the user the progress of the transaction. In this example the user has progressed to the point of having to confirm their transaction prior to completing the purchase. The electronic trading card application indicates what the user is about to purchase 308. If the user selects the 'CONFIRM' choice 310, then the transaction is completed and the display of FIG. 6C is generated on the touch sensitive display screen 107.

The transaction is confirmed with a confirmation or thank you message 312. The purchased electronic trading cards with all of its components are transferred from the server (numeral reference?) via the internet to the user's handheld device 105 running the electronic trading card application. The registry of all electronic trading cards residing on the server 101 is updated to reflect the buy transaction completed, where the user and owner of the electronic trading card and the unique identifiers or serial numbers of the transacted electronic trading cards are linked.

Optionally, upon completion of the purchase a coupon is offered for redemption of a gift. For example, if this purchase were made at a game, such as at a Boston Red Sox game at Fenway Park, Boston, Mass., the purchase gift may be a free hot dog at the concession stand 314 at Fenway Park as indicated on the touch sensitive display screen 107. The touch sensitive display screen may additionally display a bar code that can be scanned by a barcode scanner at the concession stand from the handheld device 105. As an alternative to the barcode, the coupon could be verified and redeemed by transmitting to the vendor via Bluetooth or other wireless or wired means or simply by a person in a manual manner.

In the described electronic trading card purchase example, the payment for the purchase was not shown. Examples of transfer payments include a draw down from a pre-paid debit account with the vendor of the electronic trading cards, a credit card transaction, an automatic clearing house (ACH) transaction, or a bill later transaction. With any of these transaction methods, a payment is provided by the user to the vendor of the electronic trading cards residing on the server 101, for the electronic trading cards purchased by way of the electronic trading card application communicating with the server 101 via the internet 103.

The purchase gift could be any number of redeemable coupon gifts, including, but not limited to food, memorabilia, or other merchandise at sports venues, free or reduced price electronic trading cards or other sports or non-sports related digital media downloads to the handheld device 105 running the electronic trading card application. In other embodiments, the purchase gift may vary depending on the location of the user and/or time of the transaction. For example, the 'Free Hot Dog' coupon 314 may only be sent as a purchase gift, if the user is in Fenway Park during a baseball game being played at Fenway Park. For such location and time based transactions and purchase gifts, the electronic trading card application may ascertain the time from promotional codes entered in to the electronic trading card application by the user that indicates time, the internal clock of the handheld device 105, from time information sent to the handheld device 105 from cellular communications towers and transmitters or from various clocks and time information available on the internet. The location information may be ascertained by the electronic trading card application from promotional codes entered in to the electronic trading card application by the user that indicates location, global positioning satellite (GPS) data collected and processed in the handheld device using GPS receiving electronics, or from location information from cellular communication towers and transmitters.

Figure 7:
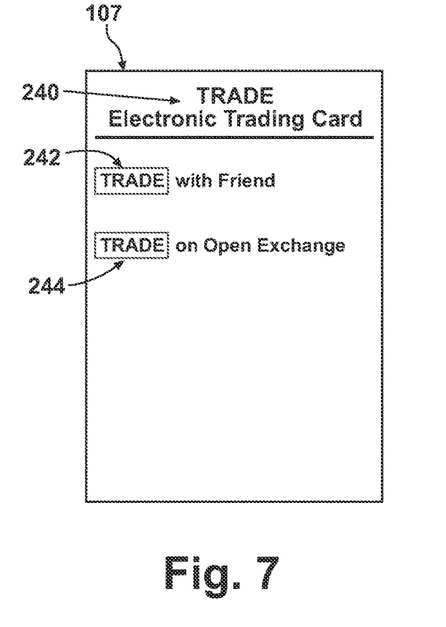
FIG. 7 is a schematic view of the electronic trading card trade screen.

The discussion will now focus on the mechanism of trading an electronic trading card. If the user were to select the menu 180 item of 'TRADE' 186 in FIG. 4, a trading interactive display of FIG. 7 will be displayed on the touch sensitive display screen 107. This trading display contains a title 240 indicating to the user what the transaction type is. This display may give the user various choices such as 'TRADE with a Friend' 242 or 'TRADE on Open Exchange' 244. The user may choose the 'TRADE with a Friend' 242 option if the user desires to transact a known grouping of electronic trading cards with a known grouping of the user's trading partner's electronic trading cards. Alternatively, the user may select the 'TRADE on Open Exchange' 244 option, where the user informs an electronic trading bulletin board of a grouping, consisting of one or more electronic trading cards, that the user wishes to trade and others may join the electronic trading bulletin board and offer groupings of one or more of their electronic trading cards in exchange for the user's grouping.

Figure 8A:
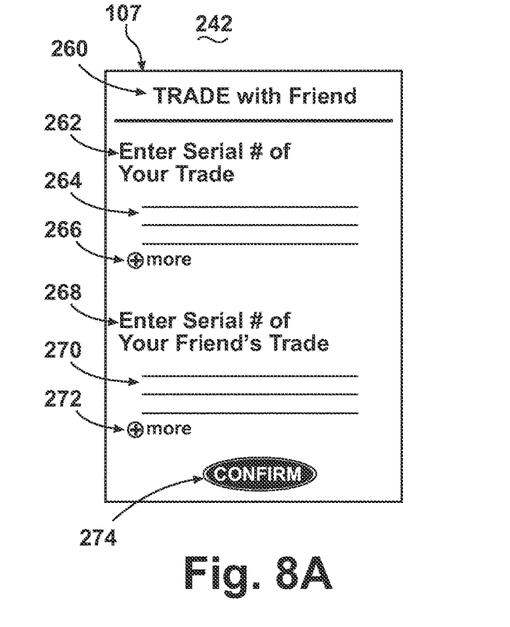
FIG. 8A is a representation of the electronic trading card trading process.

If the user picks 'TRADE with Friend' option 242, then the transaction will be executed by the electronic trading card application according to the depiction in FIG. 8. A first interactive screen with a title 'Trade with a Friend' 260 is displayed as shown in FIG. 8A. At this point the user must enter information to create the groupings of electronic trading cards to exchange, as well as the grouping of electronic trading cards of the user's trading partner. These groupings are created by entering the unique identifier, or serial number, of each of the electronic trading cards in the user entry fields 264 and 270. As indicated by the label 'Enter the Serial # of Your Trade' 262, the user's grouping must be entered in the field 264. An expansion button 266 is provided to expand this user entry field 264 if more room is needed to enter a grouping comprising a larger number of electronic trading cards. As indicated by the label 'Enter the Serial # of Your Friend's Trade' 268, the user's trading partner's grouping must be entered in the field 270. An expansion button 272 is provided to expand this user entry field 270 if more room is needed to enter a grouping comprising a larger number of electronic trading cards. The unique identifiers or serial numbers of the electronic trading cards may be entered by a variety of means including selecting characters on an electronic pop-up keyboard. Once both groupings 264 and 270 are entered, the user selects the confirm selection 274. Once this confirmation is selected the electronic trading card application running on the handheld device 105 communicates via the internet 103 the trading groups to the at least one remote server 101. The server verifies that all the electronic trading cards of each group is owned by the same entity. If any of the groupings are comprised of electronic trading cards owned by multiple entities or if any one or more of the electronic trading cards are not otherwise tradable, then the at least one remote server will send back an error message to be displayed by the electronic trading card application on the user's touch sensitive display screen 107 indicating that the desired trade can not be carried out.

Although we show creating the groupings of electronic trading cards by selecting the serial numbers of the electronic trading cards, the groupings may be formed by a variety of other means. For example, other identifiers may be entered for a specific electronic trading card, such as the year, player, team, etc., from which the electronic trading card application provides a selection sub-set of possible electronic trading cards that fit the identifiers entered. From this selection sub-set, the user selects the electronic trading cards that the user desires to populate the grouping. It should also be noted that the user's grouping may or may not contain the same number of electronic trading cards as the trading partner's grouping. As another embodiment, the user's grouping of electronic trading cards may be generated by the user on the user's handheld device and the trading partner's grouping of electronic trading cards may be generated by the trading partner on the trading partner's handheld device, where the user's handheld device and the trading partner's handheld device are communicatively linked by either wired or wireless means.

Figure 8B:
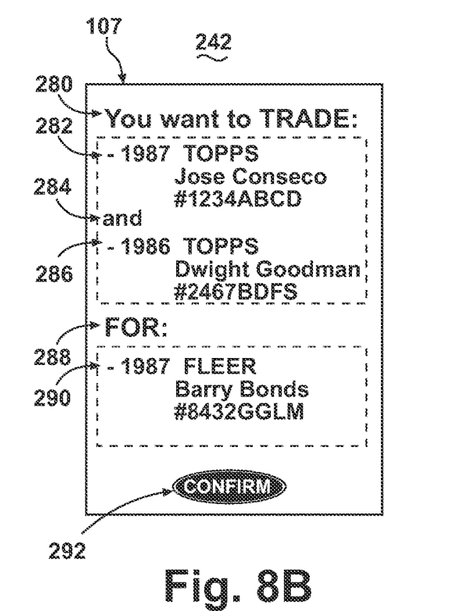
FIG. 8B is a representation of the trade request review display.

Once the two groupings of electronic trading cards are entered and confirmed and verified to be tradable by the server (#), the electronic trading card application generates the interactive display of FIG. 8B on the touch sensitive display screen 107. The top portion of the display indicates the grouping of electronic trading cards that the user entered as the grouping that the user wishes to trade. In this example, the user is trading a grouping comprising a 1987 Topps Jose Canseco' 282 with serial number 1234ABCD along with a 1986 Topps Dwight Gooden' 286 with serial number 2467BDFS for the trading partner's grouping comprising a '1987 Fleer Barry Bonds' 290 with serial number 8432GGLM. The user's grouping is indicated by the title 'You want to Trade' 280 and the trading partner's grouping is indicated by the title 'FOR:'. The combination of two electronic trading cards in the user's grouping is indicated by the Boolean operator 'and' 284.

Figure 8C:
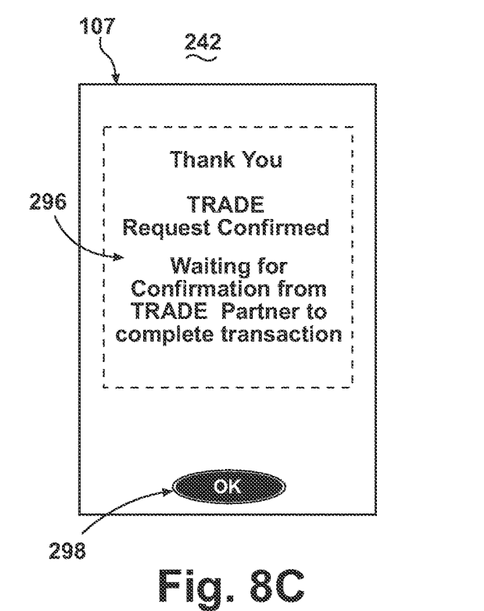
FIG. 8C is a representation of the trade request confirmation display.

Upon verifying and confirming the desired trade by selecting the confirm button 292, the electronic trading card application generates a trade confirmation screen as shown in FIG. 8C and displayed on the touch sensitive display screen 107. A message 296 confirms the trade request and informs the user that upon confirmation of from the trading partner the trade will be executed. By hitting the 'OK' button 298 the user will view a non-trading screen such as the last electronic trading card that was viewed. When the trading partner confirms the requested trade, the at least one remote server will pull both groupings of electronic trading cards from their respective handheld devices running the electronic trading card application and retransmit each grouping to the other of the handheld devices running the electronic trading card application, thereby completing the trade. The server 101 will also update the registry of all electronic trading cards to reflect the transaction completed and link the serial numbers of each electronic trading card with their new owners.

As a further feature, incentives may be offered such as coupons for free merchandise or service if a user collects, via purchase or trading, a complete set or sub-set of cards. For example, the user may be offered a coupon for a free basketball game ticket if the user collects all the players of a certain team.

It should also be noted that the descriptions above describe the embodiments of the invention by way of sports related electronic trading cards. However, the electronic trading cards and the means to transact electronic trading cards may apply to non-sports electronic trading cards, such as electronic trading cards of children's cartoon characters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of displaying an electronic trading card on a handheld device, wherein the handheld device comprises a processor, a non-transitory memory, a display, and a means for accepting user input, and the handheld device is configured to detect motion, orientation, and direction of rotation using accelerometer-based motion detector devices, the method comprising:
   running an electronic trading card application in the processor of the handheld device;
   storing an electronic trading card in the non-transitory memory of the handheld device using the electronic trading card application, wherein the electronic trading card comprises at least one component;
   selecting the electronic trading card for display by the means for accepting user input;
   displaying the at least one component of the electronic trading card on the display; and
   upon detecting motion, orientation, and direction of rotation of the handheld device, discontinuing display of the at least one component and displaying at least one other component of the electronic trading card on the display.

2. The method of claim 1, wherein the at least one electronic trading card includes a package of components that comprises:
   a picture, a video clip, a database of information, electronic trading card relation identifiers, and a unique identifier.

3. The method of claim 1, wherein the communication includes an electronic coupon to redeem a gift'.

4. The method of claim 3, wherein the electronic coupon is based on one or both of time and location of the at least one person.

5. The method of claim 4, further comprising determining the time and location of the at least one person based upon a promotional code entered by the at least one person.

6. The method of claim 1, wherein each of the electronic trading cards includes a package of components that comprises:
   a picture, a video clip, a database of information, electronic trading card relation identifiers and a unique identifier.

7. The method of claim 1, wherein the displaying the at least one electronic trading card further comprises displaying one or more of another set of components of the at least one electronic trading card based upon user input.

* * * * *